(12) United States Patent
Iyer et al.

(10) Patent No.: US 9,315,689 B2
(45) Date of Patent: Apr. 19, 2016

(54) SOUND DAMPING COMPOSITIONS AND METHODS FOR APPLICATION AND USE

(75) Inventors: Sridhar G. Iyer, Matthews, NC (US); James Joseph Duis, Charlotte, NC (US); Mark Gordon, Huntersville, NC (US); Beverly Ann Gordon, legal representative, Hunterville, NC (US); Luke Egan, Rock Hill, SC (US)

(73) Assignee: BASF SE, Ludwigshafen (DE)

( * ) Notice: Subject to any disclaimer, the term of this patent is extended or adjusted under 35 U.S.C. 154(b) by 47 days.

(21) Appl. No.: 13/704,049

(22) PCT Filed: Jun. 21, 2010

(86) PCT No.: PCT/US2010/039364
§ 371 (c)(1),
(2), (4) Date: Feb. 20, 2013

(87) PCT Pub. No.: WO2011/162740
PCT Pub. Date: Dec. 29, 2011

(65) Prior Publication Data
US 2013/0253107 A1 Sep. 26, 2013

(51) Int. Cl.
| | |
|---|---|
| *C08K 5/15* | (2006.01) |
| *C08K 3/26* | (2006.01) |
| *C08K 3/34* | (2006.01) |
| *C08G 18/08* | (2006.01) |
| *C08F 257/02* | (2006.01) |
| *B05D 3/02* | (2006.01) |
| *C09D 133/08* | (2006.01) |
| *C08F 20/10* | (2006.01) |
| *C08L 33/08* | (2006.01) |
| *C09D 7/00* | (2006.01) |
| *C09D 7/02* | (2006.01) |
| *C09D 7/12* | (2006.01) |
| *G10K 11/162* | (2006.01) |
| *C09D 175/04* | (2006.01) |
| *C08L 33/00* | (2006.01) |
| *C08L 75/04* | (2006.01) |

(52) U.S. Cl.
CPC ............ *C09D 133/08* (2013.01); *B05D 3/0254* (2013.01); *C08F 20/10* (2013.01); *C08L 33/08* (2013.01); *C09D 7/004* (2013.01); *C09D 7/02* (2013.01); *C09D 7/1216* (2013.01); *C09D 175/04* (2013.01); *G10K 11/162* (2013.01); *C08L 33/00* (2013.01); *C08L 75/04* (2013.01)

(58) Field of Classification Search
CPC ......... C08F 20/10; C08L 33/08; C08L 33/02; C08L 75/04; C08L 33/00; C09D 7/004; C09D 7/02; C09D 175/04; C09D 7/1216; C09D 133/08; G10K 11/162; B05D 3/0254
USPC ........ 524/114, 507, 449, 425, 533; 427/385.5
See application file for complete search history.

(56) References Cited

U.S. PATENT DOCUMENTS

| | | | |
|---|---|---|---|
| 5,231,145 A | 7/1993 | Brueckmann et al. | |
| 5,240,771 A | 8/1993 | Brueckmann et al. | |
| 5,252,662 A | 10/1993 | Su et al. | |
| 5,322,731 A | 6/1994 | Callahan, Jr. et al. | |
| 5,374,698 A | 12/1994 | Young et al. | |
| 5,464,916 A | 11/1995 | Young et al. | |
| 5,502,138 A | 3/1996 | Krishnan et al. | |
| 5,508,367 A | 4/1996 | Zajaczkowski | |
| 5,654,387 A | 8/1997 | Bennett et al. | |
| 5,998,554 A | 12/1999 | Yokoo | |
| 6,084,024 A | 7/2000 | Mao et al. | |
| 6,441,114 B1 | 8/2002 | Peloquin et al. | |
| 6,569,970 B2 | 5/2003 | Reck et al. | |
| 6,608,134 B1 | 8/2003 | Tobing et al. | |
| 6,624,273 B1 | 9/2003 | Everaerts et al. | |
| 6,770,219 B2 | 8/2004 | Tong | |
| 6,774,198 B2 | 8/2004 | Binder et al. | |
| 6,841,641 B2 | 1/2005 | Olson et al. | |
| 6,964,986 B2 | 11/2005 | Bachon et al. | |

(Continued)

FOREIGN PATENT DOCUMENTS

| | | |
|---|---|---|
| WO | 0104224 | 1/2001 |
| WO | 0204133 | 1/2002 |
| WO | 03078536 | 9/2003 |

OTHER PUBLICATIONS

International Search Report dated Sep. 1, 2010, issued in International Patent Application No. PCT/US2010/039364.

(Continued)

*Primary Examiner* — William Cheung
(74) *Attorney, Agent, or Firm* — Meunier Carlin & Curfman LLC

(57) ABSTRACT

Sound damping compositions and methods for their application are described herein. The compositions can include a polymer, a polyacrylate rheology modifier, and a polyurethane rheology modifier. The compositions can alternatively include a polymer derived from greater than 80% of one or more monomers selected from the group consisting of butyl acrylate, 2-ethylhexyl acrylate, methyl methacrylate, methyl acrylate and ethyl acrylate and combinations thereof and greater than 0% and less than 4% of one or more functional monomers, at least one rheology modifier, and a surfactant. Also described herein are sound damping products including the compositions described herein and structures including the sound damping products. Methods for damping sound in a structure are further described herein. The methods include applying the compositions to the surface of a structure and drying the composition.

26 Claims, No Drawings

(56) References Cited

U.S. PATENT DOCUMENTS

| | | |
|---|---|---|
| 7,015,294 B2 | 3/2006 | Dausch et al. |
| 7,063,895 B2 | 6/2006 | Rodriguez et al. |
| 7,317,053 B1 | 1/2008 | Gelman et al. |
| 7,589,158 B2 | 9/2009 | Yang et al. |
| 2002/0019480 A1* | 2/2002 | Munro et al. ............ 524/589 |
| 2003/0199629 A1 | 10/2003 | Gelman et al. |
| 2004/0211934 A1 | 10/2004 | Lestarge |
| 2006/0057345 A1 | 3/2006 | Surace et al. |
| 2006/0079635 A1 | 4/2006 | Pohl et al. |
| 2008/0039564 A1 | 2/2008 | Desai et al. |
| 2008/0051499 A1 | 2/2008 | Kania et al. |
| 2009/0048357 A1 | 2/2009 | Yasui et al. |
| 2010/0062209 A1 | 3/2010 | Wevers et al. |

OTHER PUBLICATIONS

International Preliminary Report on Patentability dated Dec. 28, 2012, issued in International Patent Application No. PCT/US2010/039364.

Written Opinion dated Sep. 1, 2010, issued in International Patent Application No. PCT/US2010/039364.

\* cited by examiner

SOUND DAMPING COMPOSITIONS AND METHODS FOR APPLICATION AND USE

This application is a U.S. National stage application of International Application No. PCT/JP10/39364, filed Jun. 21, 2010, which claims priority to Japanese Patent Application No. 2010-142868 filed on Jun. 23, 2010, the contents of each of which are hereby incorporated herein by reference.

BACKGROUND

Acoustical design focuses on keeping unwanted sounds and vibrations from entering or leaving a structure. Various materials have been combined to form sound damping compositions to achieve this goal. However, these compositions can be impractical for application and use after storage periods due to composition instability. In particular, these compositions can experience large increases or decreases in viscosity that affect the ability to apply the compositions to a substrate. Thus, there is a need for sound damping compositions with enhanced stability over periods of time.

SUMMARY

Sound damping compositions and methods for their application and use are described herein. The compositions can include a polymer, a polyacrylate rheology modifier, and a polyurethane rheology modifier. In some examples, the composition further comprises a surfactant. In some examples, the composition further comprises a pH buffer (e.g., an alkaline pH buffer). The polymer can include, for example, an acrylic polymer, a styrene-acrylic copolymer, a styrene-butadiene copolymer, a vinyl-acrylic copolymer, or a mixture thereof. In some examples, the polymer is derived from at least 60% of a (meth)acrylate selected from the group consisting of butyl acrylate, 2-ethylhexyl acrylate, ethyl acrylate, methyl methacrylate, and methyl acrylate. For example, the polymer can be derived from at least 80% of a (meth)acrylate selected from the group consisting of butyl acrylate, 2-ethylhexyl acrylate, ethyl acrylate, methyl methacrylate, and methyl acrylate. The polymers of the compositions described herein can be further derived from one or more functional monomers, including, for example, acrylic acid, methacrylic acid, vinylsulfonic acid, itaconic acid, hydroxyethyl(meth)acrylate, hydroxypropyl(meth)acrylate, diacetone-acrylamide or mixtures thereof. In some examples, the polymer is further derived from styrene, (meth)acrylonitrile, (meth)acrylamide, vinyl acetate, or mixtures thereof.

In some examples, the polyacrylate rheology modifier of the compositions described herein can include a sodium polyacrylate rheology modifier. The surfactant of the compositions described herein can include, for example, an alcohol alkoxylate (e.g., a C9-C16 alkyl alcohol alkoxylate, optionally containing from 5-12 ethylene oxide units, such as a tridecyl alcohol alkoxylate). In some examples, the $T_g$ of the polymer is from −10° C. to −50° C.

The compositions described herein can further include water to form a polymer dispersion. The compositions can also include a coalescing agent or a filler (e.g., a filler that attenuates sound such as mica, calcium carbonate, or mixtures thereof). In some examples, the viscosity of the composition at 23° C. is from 7000 cP to 15,000 cP (e.g., from 10,000 cP to 12,000 cP).

Also described herein are sound damping compositions including a polymer derived from greater than 80% of one or more monomers selected from the group consisting of butyl acrylate, 2-ethylhexyl acrylate, methyl methacrylate, methyl acrylate, ethyl acrylate, and combinations thereof and greater than 0% and less than 4% of one or more functional monomers. In some examples, the rheology modifier is a polyacrylate rheology modifier. In some examples, the rheology modifier is a polyurethane rheology modifier.

Also described herein are sound damping products, such as adhesives, coatings, caulks, and sealants, comprising the composition described herein. Structures including the sound damping products are also provided herein.

Further provided is a method for damping sound in a structure, including the steps of applying a composition including a polymer, a polyacrylate rheology modifier, and a polyurethane rheology modifier to the surface of the structure, and drying the composition. In some examples, a surfactant is also included in the composition.

The details of one or more embodiments are set forth in the description below. Other features, objects, and advantages will be apparent from the description and from the claims.

DETAILED DESCRIPTION

Sound damping compositions and methods of their application and use are described herein. The sound damping compositions can include a polymer, a polyacrylate rheology modifier, and a polyurethane rheology modifier.

The polymers can be derived from various monomers including vinyltoluenes; conjugated dienes (e.g., isoprene); α,β-monoethylenically unsaturated mono- and dicarboxylic acids or anhydrides thereof (e.g., crotonic acid, dimethacrylic acid, ethylacrylic acid, allylacetic acid, vinylacetic acid maleic acid, fumaric acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g., (meth)acrylamide, N-tert-butylacrylamide, and N-methyl(meth)acrylamide); diacetone acrylamide; (meth)acrylonitrile; vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl(meth) acrylate, hydroxypropyl(meth)acrylate, and methylpolyglycol acrylate); silane monomers; and monomers containing glycidyl groups (e.g., glycidyl methacrylate). As used herein, the term "(meth)acrylate" includes both acrylates and methacrylates.

Additional monomers or co-monomers that can be used include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl(meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine).

The monomers used according to the invention may include cross-linking monomers, such as divinylbenzene; 1,4-butanediol diacrylate; methacrylic acid anhydride; monomers containing 1,3-diketo groups (e.g., acetoacetoxyethyl(meth)acrylate or diacetonacrylamide); and monomers containing urea groups (e.g., ureidoethyl(meth)acrylate, acrylamidoglycolic acid, and methacrylamidoglycolate methyl ether); and silane crosslinkers (e.g., 3-methacryloxypropyl trimethoxysilane and 3-mercaptopropyl trimethoxysilane). Additional examples of crosslinkers include N-alkylolamides of α,β-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers include diesters or triesters of dihydric and trihydric alcohols with α,β-monoethylenically unsaturated monocarboxylic acids (e.g., di(meth)acrylates, tri(meth)acrylates), of which in turn acrylic acid and methacrylic acid can be employed. Examples of such monomers containing two non-conjugated ethylenically unsaturated double bonds are alkylene glycol diacrylates and dimethacrylates, such as ethylene glycol diacrylate, 1,3-butylene glycol diacrylate, 1,4-butylene glycol diacrylate and propylene glycol diacrylate, vinyl methacrylate, vinyl acrylate, allyl methacrylate, allyl acrylate, diallyl maleate, diallyl fumarate and methylenebisacrylamide. The crosslinking monomers when used in the copolymer can be present in an amount of from 0.2% to 5% by weight based on the weight of the total monomer.

The polymers described herein can include acrylic polymers, styrene-acrylic copolymers, styrene-butadiene copolymers, vinyl-acrylic copolymers, or mixtures thereof. In some embodiments, the copolymer can be a straight acrylic copolymer derived from monomers including (meth)acrylic acid, (meth)acrylic acid esters, (meth)acrylamide, (meth)acrylonitrile, and mixtures thereof. For example, the straight acrylic copolymer can include at least one of (meth)acrylic acid, itaconic acid, methyl(meth)acrylate, ethyl(meth)acrylate, n-butyl(meth)acrylate, isobutyl(meth)acrylate, tert-butyl(meth)acrylate, 2-ethylhexyl(meth)acrylate, (meth)acrylamide, (meth)acrylonitrile, hydroxypropyl(meth)acrylate, hydroxyethyl(meth)acrylate and diacetone-acrylamide. The straight acrylic copolymer can include from 77% to 99% by weight of (meth)acrylates, 0 to 3% by weight of (meth)acrylamide, and 0 to 10% by weight of (meth)acrylonitrile. The straight acrylic copolymer can also include from 0 to 5% by weight of one or more functional monomers. In some embodiments, the straight acrylic polymer can include butyl acrylate, 2-ethylhexyl acrylate, ethyl acrylate, methyl methacrylate, and/or methyl acrylate, and optionally (meth)acrylonitrile, (meth)acrylamide, and/or functional monomers.

In some embodiments, the copolymer can be a styrene acrylic copolymer derived from monomers including styrene, (meth)acrylic acid, (meth)acrylic acid esters, (meth)acrylamide, (meth)acrylonitrile, and mixtures thereof. For example, the styrene acrylic copolymer can include styrene and at least one of (meth)acrylic acid, itaconic acid, methyl(meth)acrylate, ethyl(meth)acrylate, n-butyl(meth)acrylate, isobutyl(meth)acrylate, tert-butyl(meth)acrylate, 2-ethylhexyl(meth)acrylate, (meth)acrylamide, (meth)acrylonitrile, hydroxypropyl(meth)acrylate, hydroxyethyl(meth)acrylate, and diacetone-acrylamide. The styrene acrylic copolymer can include from 39 to 69% by weight of (meth)acrylates, from 30 to 60% by weight of styrene, from 0 to 3% by weight of (meth)acrylamide, and from 0 to 10% by weight of (meth)acrylonitrile. The styrene acrylic copolymer can also include from 0 to 5% by weight of one or more functional monomers. In some embodiments, the styrene acrylic polymer can include styrene, butyl acrylate, 2-ethylhexyl acrylate, ethyl acrylate, methyl methacrylate, and/or methyl acrylate, and optionally (meth)acrylonitrile, (meth)acrylamide, and/or functional monomers.

In some embodiments, the copolymer can be a vinyl acrylic copolymer derived from monomers including vinyl acetate, (meth)acrylic acid, (meth)acrylic acid esters, (meth)acrylamide, (meth)acrylonitrile, and mixtures thereof. For example, the vinyl acrylic copolymer can include vinyl acetate and at least one of (meth)acrylic acid, itaconic acid, methyl(meth)acrylate, ethyl (meth)acrylate, n-butyl(meth)acrylate, isobutyl(meth)acrylate, tert-butyl(meth)acrylate, 2-ethylhexyl (meth)acrylate, (meth)acrylamide, (meth)acrylonitrile, hydroxypropyl(meth)acrylate, hydroxyethyl(meth)acrylate, and diacetone-acrylamide. The vinyl acrylic copolymer can include from 39 to 69% by weight of (meth)acrylates, from 30 to 60% by weight of vinyl acetate, 0 to 3% by weight of (meth)acrylamide, and 0 to 10% by weight of (meth)acrylonitrile. The vinyl acrylic copolymer can also include from 0 to 5% by weight of one or more functional monomers. In some embodiments, the vinyl acrylic polymer can include vinyl acetate, butyl acrylate, 2-ethylhexyl acrylate, ethyl acrylate, methyl methacrylate, and/or methyl acrylate, and optionally (meth)acrylonitrile, (meth)acrylamide, and/or functional monomers.

In some embodiments, the copolymer can be a styrene butadiene copolymer derived from monomers including styrene, butadiene, (meth)acrylamide, (meth)acrylonitrile, itaconic acid, and (meth)acrylic acid. The styrene butadiene copolymer can include from 40 to 75% by weight of styrene, from 25 to 60% by weight of butadiene, 1 to 10% of itaconic and/or (meth)acrylic acid, 0 to 3% by weight of (meth)acrylamide, and 0 to 20% by weight (meth)acrylonitrile.

In some embodiments, the polymers can be derived from at least 60% of one or more (meth)acrylates. For example, the polymers can be derived from at least 65%, at least 70%, at least 75%, at least 80%, at least 85%, at least 90%, at least 95%, or at least 99% of a (meth)acrylate. The polymers can be straight acrylics, vinyl acrylics or styrene acrylics, for example. Examples of (meth)acrylates include butyl acrylate, 2-ethylhexyl acrylate, ethyl acrylate, methyl methacrylate, and methyl acrylate. The polymers described herein can include one or more functional monomers. Examples of suitable functional monomers include acrylic acid, methacrylic acid, vinylsulfonic acid, itaconic acid, hydroxyethyl(meth) acrylate, hydroxypropyl(meth)acrylate and diacetone-acrylamide. The polymers can also be derived from other monomers such as styrene, (meth)acrylonitrile, (meth)acrylamide, vinyl acetate, or mixtures of these.

In some examples, the polymer is derived from greater than 80% of one or more monomers selected from the group consisting of butyl acrylate, 2-ethylhexyl acrylate, methyl methacrylate, methyl acrylate, ethyl acrylate, and combinations of these. For example, the polymer can be derived from greater than 81%, greater than 82%, greater than 83%, greater than 84%, greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98%, or greater than 99% of butyl acrylate, 2-ethylhexyl acrylate, methyl methacrylate, methyl acrylate or ethyl acrylate, or combinations of these. In some examples, the polymer is derived from greater than 0% and less than 4% of one or more functional monomers. The functional monomers can be selected from the group consisting of acrylic acid, methacrylic acid, vinylsulfonic acid, itaconic acid, hydroxyethyl(meth)acrylate, hydroxypropyl(meth)acrylate, diacetone-acrylamide or mixtures thereof. For example, the polymer can be derived from less than 3.9%, less than 3.8%, less than 3.7%, less than 3.6%, less than 3.5%, less than 3.4%, less than 3.3%, less than 3.2%, less than 3.1%, less than 3.0%, less than 2.9%, less than 2.8%, less than 2.7%, less than 2.6%, less than 2.5%, less than 2.4%, less than 2.3%, less than 2.2%, less than 2.1%, less than 2.0%, less than 1.9%, less than 1.8%, less than 1.7%, less than 1.6%, less than 1.5%, less than 1.4%, less than 1.3%, less than 1.2%, less than 1.1%, less than 1.0%, less than 0.9%, less than 0.8%, less than 0.7%, less than 0.6%, less than 0.5%, less than 0.4%, less than 0.3%, less than 0.2%, or less than 0.1% of functional monomers.

The polymers described herein can be prepared by polymerizing the monomers using free-radical emulsion polymerization. The emulsion polymerization temperature is generally from 30° C. to 95° C. or from 75° C. to 90° C. The polymerization medium can include water alone or a mixture of water and water-miscible liquids, such as methanol. In some embodiments, water is used alone. The emulsion polymerization can be carried out either as a batch, semi-batch, or continuous process. Typically, a semi-batch process is used. In some embodiments, a portion of the monomers can be heated to the polymerization temperature and partially polymerized, and the remainder of the polymerization batch can be subsequently fed to the polymerization zone continuously, in steps or with superposition of a concentration gradient.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates. In the combined systems, the carbohydrate derived compound can also be used as the reducing component. In general, the amount of free-radical initiator systems employed can be from 0.1 to 2%, based on the total amount of the monomers to be polymerized. In some embodiments, the initiators are ammonium and/or alkali metal peroxydisulfates (e.g., sodium persulfate), alone or as a constituent of combined systems. The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

One or more polymerization surfactants can be included to improve certain properties of the polymerization mixture, including particle stability. For example, sodium laureth sulfate, sodium hexametaphosphate, tetrasodium pyrophosphate, tetrapotassium pyrophosphate, and alkylbenzene sulfonic acid or sulfonate surfactants could be used. Examples of commercially available surfactants include CALFOAM ES-303 (Pilot Chemical Company; Cincinnati, Ohio); DOWFAX 2A1, an alkyldiphenyloxide disulfonate surfactant available from Dow Chemical Company (Midland, Mich.); and ALCOSPERSE 149, a sodium polyacrylate surfactant available from Akzo Nobel Surface Chemistry (Chicago, Ill.). In general, the amount of surfactants employed can be from 0.01 to 5%, based on the total amount of the monomers to be polymerized.

Small amounts (e.g., from 0.01 to 2% by weight based on the total monomer weight) of molecular weight regulators, such as a mercaptan, can optionally be used. Such substances are preferably added to the polymerization zone in a mixture with the monomers to be polymerized and are considered part of the total amount of unsaturated monomers used in the copolymer.

In some examples, the polymers described herein have glass transition temperatures ($T_g$) from −10° C. to −50° C. as measured by differential scanning calorimetry. For example, the $T_g$ of the polymer can be between −15° C. and −46° C., −20° C. and −43° C., and −25° C. and −40° C.

Individual rheology modifiers can be included in the compositions to, for example, increase the viscosity of the composition, modify the pour characteristics of the composition, or facilitate the application of the composition to a surface. In some embodiments, the compositions described herein can include a polyacrylate rheology modifier, a polyurethane rheology modifier, or a combination of these. One or more rheology modifiers can be selected and used to provide a desired viscosity of the composition (e.g., from 7,000 cP to 15,000 cP). The compositions can further include one or more additional rheology modifiers. In examples in which multiple rheology modifiers are used, the rheology modifiers can be added individually to form the composition or can be combined prior to adding to the composition. The rheology modifiers can also be mixed with water before adding to the composition.

As described above, the compositions can include a polyacrylate rheology modifier. In some embodiments, the polyacrylate rheology modifier includes a neutralized polyacrylate solution. In some examples, the polyacrylate rheology modifier can be a sodium polyacrylate rheology modifier. An example of a suitable polyacrylate rheology modifier for use in the compositions described herein includes ALCOGUM AN-10, a sodium polyacrylate rheology modifier with a solid content of 10% and a viscosity range from 200 cP to 400 cP commercially available from Alco Chemical (Chattanooga, Tenn.). The polyacrylate rheology modifiers can include one polyacrylate rheology modifier or a mixture of polyacrylate rheology modifiers. The amount of polyacrylate thickener(s) present in the composition can be, for example, 99%, 90%, 80%, 70%, 60%, 50%, 40%, 30%, 20%, 10%, 5%, 1% or 0% by weight based on the total amount of rheology modifiers present in the composition.

The compositions described herein can also include polyurethane rheology modifiers. Polyurethane rheology modifiers refer to any rheology modifier containing urethane linkages. In some embodiments, the polyurethane rheology modifier includes a hydrophobically modified ethoxylated urethane. An example of a suitable polyurethane rheology modifier for use in the compositions described herein includes COAPUR BR 100P, commercially available from Coatex Inc. (Chester, S.C.). The polyurethane rheology modifiers can include one polyurethane rheology modifier or a mixture of polyurethane rheology modifiers. The amounts of polyurethane thickener(s) can be, for example, 99%, 90%, 80%, 70%, 60%, 50%, 40%, 30%, 20%, 10%, 5%, 1% or 0% by weight based on the total amount of rheology modifiers present in the composition.

Other suitable rheology modifiers can be used in the compositions including, for example, alkali swellable emulsions, hydrophobically modified alkali swellable emulsions, clays, cellulose derivatives, and mixtures of these.

In some embodiments, a combination of polyacrylate and polyurethane rheology modifiers can be included in the composition. This combination of rheology modifiers can provide stability to the compositions to maintain the desired viscosity for an extended period of time during storage (e.g., for six months or longer).

The total amount of rheology modifiers present in the composition can be less than 10% based on total weight of the composition. For example, the total amount of rheology modifiers can be less than 9%, less than 8%, less than 7%, less than 6%, less than 5%, less than 4%, less than 3%, less than 2%, or less than 1% based on the total weight of the composition.

The compositions can further include one or more surfactants. These surfactants differ from the polymerization surfactants in that they are post-added to the polymer (i.e., the surfactants are not present during the polymerization process). The surfactants can be included in the compositions to improve certain properties of the compositions, such as, for example, rinsability of the composition. Nonionic surfactants and anionic surfactants are suitable for use in the compositions described herein. In some embodiments, the surfactants include nonionic surfactants. In some embodiments, the surfactants include nonionic surfactants in combination with anionic surfactants. Suitable surfactants include alcohol alkoxylates, such as C9-C16 alkyl alcohol alkoxylates, optionally containing, for example, from 5-12 ethylene oxide units. For example, tridecyl alcohol alkoxylates could be used. An example of a suitable surfactant includes LUTENSOL TDA-8, a C13 alcohol with 8 ethylene oxide units commercially available from BASF Corporation (Florham Park, N.J.). In general, the amount of surfactants employed can be from 0.5% to 10%, based on the total weight of the composition. For example, the amount of surfactants present in the composition can be from 1% to 8%, 1.5% to 6%, or 2% to 4% based on the weight of the composition. In some examples, the amount of surfactants present is greater than 0% and less than 4% of the composition. For example, the amount of surfactants present can be less than 3%, less than 2.5%, less than 2%, less than 1.5%, less than 1%, or less than 0.5% of the composition.

The compositions described herein can further include coalescing solvents (e.g., plasticizers). Since continuous film formation is desirable to attain better sound attenuation, coalescing solvents can be incorporated to lower the minimum film forming temperature of the polymer. Suitable coalescing solvents include glycol ethers such as ethylene and propylene glycols and their esters, hexyl cellosolve, butyl cellosolve, hexyl carbitol and butyl carbitol. Examples of commercially available coalescing solvents include TEXANOL alcohols commercially available from Eastman Chemical Company (Kingsport, Tenn.).

The compositions described herein can also include pH buffers to control the pH of the compositions. In some examples, the pH buffers are alkaline (e.g., ammonia or ammonium hydroxide). In some embodiments, the pH of the composition ranges from 7.5 to 9.0. The pH buffers can be present in an amount of 5% or less based on the weight of the composition.

Crosslinkers can also be included in the compositions described herein. In some embodiments, the polymers include monomers that can react with crosslinkers such as, for example hydrazides. The crosslinkers can be added to the composition after the formation of the polymer. For example, diacetone acrylamide can be used as a monomer to form the polymers described herein. The diacetone acrylamide-containing polymer can react with adipic dihydrazide added to the composition after formation of the polymer.

The compositions described herein can further include water to form a polymer dispersion. The dispersions can typically include a solids percentage of from 20 to 75% (e.g. from 50 to 70%). In some examples, the compositions can further include one or more additives selected from the group consisting of pigments, tackifiers, wetting agents, defoamers, biocides, flame retardants, and mixtures thereof.

The polymer dispersions can further include fillers. In some embodiments, the fillers can attenuate sound. Examples of the sound attenuating fillers include mica, calcium carbonates (e.g., limestone), and mixtures of these. Further examples of fillers suitable for use in the polymer dispersions described herein include clays (e.g., kaolin), feldspar, talc, activated carbon, fused silica, fumed silica, amorphous fused silica, aluminum trihydrate (ATH), sand, ground sand, wollastonite, alumina, bentonite, quartz, garnet, saponite, beidellite, granite, calcium oxide, calcium hydroxide, antimony trioxide, barium sulfate, magnesium oxide, titanium dioxide, zinc carbonate, zinc oxide, nepheline syenite, perlite, diatomite, pyrophillite, soda ash, trona, and mixtures thereof.

In some embodiments, the viscosity of the composition is from 7,000 cP to 15,000 cP at a temperature of 23° C. For example, the viscosity of the composition can be from 8,000 cP to 14,000 cP; from 9,000 cP to 13,000 cP; or from 10,000 cP to 12,000 cP. The viscosity of the composition can be measured using a Brookfield viscometer using spindle LV #4 at 30 rpm.

The compositions described herein can be used in sound damping products, including adhesives, coatings, paints, caulks, or sealants. The sound damping products display stability over a period of time due to the stabilization in viscosity provided by the rheology modifiers. In some examples, the sound damping products are suitable for application to a substrate after extended storage periods (e.g., after six months or longer). In some examples, the sound damping products have sound transmission class ratings greater than 30 as measured according to ASTM Standard E90 and ASTM Standard E413 (i.e., the sound damping products reduce transmitted sound by 30 decibels or greater). Further, the sound damping products have noise reduction coefficients less than 0.60 as measured according to ASTM Standard C423 (i.e., the sound damping products absorb less than 60% and reflects greater than 40% of sound that contacts the products.

The sound damping products can be used in structures, including, for example, textiles, floors, automobile dashboards, doors, and roofs. The compositions described herein can also be used for damping sound in a structure. The composition can be applied to one or more surfaces of the structure and then dried. Additional components, such as, for example, surfactants, can be included in the composition. Additional layers of the composition can be applied to the dried composition.

The examples below are intended to further illustrate certain aspects of the methods and compositions described herein, and are not intended to limit the scope of the claims.

EXAMPLES

Example 1

Composition Formulation

Exemplary ingredients for a sound damping composition as described herein are shown in Table 1. A suitable amount of water is added to the composition to achieve a viscosity of 7,000 cP-15,000 cP.

TABLE 1

| Ingredients | Parts by weight of composition |
| --- | --- |
| Polymer | 47-70 |
| Polyacrylate Rheology Modifier | 0.1-1.0 |
| Polyurethane Rheology Modifier | 0.1-1.0 |
| Surfactant | 0.5-5 |

The polymer can be added as a polymer dispersion in water. The amount of rheology modifiers added to provide the desired viscosity depends on various factors including the solids percentage of the polymer dispersion and the particular polymer used. The composition shown in Table 1 can further include a pH buffer to provide a pH of the composition from 7.5 to 9.0.

Example 2

Polymer Components

Exemplary monomer ranges for preparation of the polymers described herein are shown in Tables 2-4.

TABLE 2

| Monomers | Parts by weight of total monomers |
| --- | --- |
| n-Butyl acrylate | 60-99 |
| Styrene | 0-15 |
| Vinyl Acetate | 0-15 |
| Acrylonitrile | 0-10 |
| Functional Monomers | 0.1-4 |
| Acrylamide | 0-3 |

The $T_g$ for the polymer formed from the monomers shown in Table 2 is generally from −10° C. to −50° C.

TABLE 3

| Monomers | Parts by weight of total monomers |
| --- | --- |
| 2-Ethylhexyl acrylate | 50-99 |
| Methyl methacrylate | 0-15 |
| Styrene | 0-15 |
| Vinyl Acetate | 0-15 |
| Acrylonitrile | 0-10 |
| Functional Monomers | 0.1-4 |
| Acrylamide | 0-3 |

The $T_g$ for the polymer formed from the monomers shown in Table 3 is generally from −10° C. to −50° C.

TABLE 4

| Monomers | Parts by weight of total monomers |
| --- | --- |
| n-Butyl acrylate | 25-74 |
| 2-Ethylhexyl acrylate | 25-74 |
| Methyl methacrylate | 0-15 |
| Styrene | 0-15 |
| Vinyl Acetate | 0-15 |
| Acrylonitrile | 0-10 |
| Functional Monomers | 0.1-4 |
| Acrylamide | 0-3 |

The $T_g$ for the polymer formed from the monomers shown in Table 4 is generally from −10° C. to −50° C.

The compositions, products, and methods of the appended claims are not limited in scope by the specific compositions, products, and methods described herein, which are intended as illustrations of a few aspects of the claims and any compositions, products, and methods that are functionally equivalent are intended to fall within the scope of the claims. Various modifications of the compositions, products, and methods in addition to those shown and described herein are intended to fall within the scope of the appended claims. Further, while only certain representative composition materials and method steps disclosed herein are specifically described, other combinations of the composition materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed.

What is claimed is:

1. A sound damping composition, comprising:
   47 to 70 parts by weight of a polymer;
   a polyacrylate thickener; and
   a polyurethane thickener,
   wherein the total amount of thickeners in the composition is 2 parts by weight or less, wherein the polyacrylate thickener comprises sodium polyacrylate.

2. The composition of claim 1, further comprising an alkaline pH buffer.

3. The composition of claim 1, wherein the polymer comprises an acrylic polymer, a styrene-acrylic copolymer, a styrene-butadiene copolymer, a vinyl-acrylic copolymer, or a mixture thereof.

4. The composition of claim 1, wherein the polymer is derived from at least 60% of a (meth)acrylate selected from the group consisting of butyl acrylate, 2-ethylhexyl acrylate, ethyl acrylate, methyl methacrylate, and methyl acrylate.

5. The composition of claim 4, wherein the polymer is derived from at least 80% of a (meth)acrylate selected from the group consisting of butyl acrylate, 2-ethylhexyl acrylate, ethyl acrylate, methyl methacrylate, and methyl acrylate.

6. The polymer of claim 1, wherein the polymer is further derived from one or more functional monomers, the one or more functional monomers including acrylic acid, methacrylic acid, vinylsulfonic acid, itaconic acid, hydroxyethyl (meth)acrylate, hydroxypropyl (meth)acrylate, diacetone acrylamide or mixtures thereof.

7. The composition of claim 1, wherein the polymer is further derived from styrene.

8. The composition of claim 1, wherein the polymer is further derived from (meth)acrylonitrile.

9. The composition of claim 1, wherein the polymer is further derived from vinyl acetate.

10. The composition of claim 1, wherein the polyacrylate thickener comprises a sodium polyacrylate thickener.

11. The composition of claim 1, further comprising a surfactant, wherein the surfactant comprises an alcohol alkoxylate.

12. A sound damping composition, comprising:
    47 to 70 parts by weight of a polymer;
    a polyacrylate thickener; and
    a polyurethane thickener;
    a surfactant comprises a $C_9$-$C_{16}$ alkyl alcohol alkoxylated, wherein the total amount of rheology thickeners in the composition is 2 parts by weight or less.

13. The composition of claim 12, wherein the surfactant includes from 5-12 ethylene oxide units.

14. The composition of claim 1, wherein the $T_g$ of the polymer is from −10° C. to −50° C.

15. The composition of claim 1, further comprising water to form a polymer dispersion.

16. The composition of claim 1, further comprising a coalescing agent.

17. The composition of claim 1, further comprising a filler that attenuates sound.

18. The composition of claim 17, wherein the filler comprises mica, calcium carbonate, or mixtures thereof.

19. The composition of claim 1, wherein the viscosity of the composition at 23° C. is from 7000 cP to 15,000 cP.

20. A sound damping product comprising the composition of claim 1, wherein the sound damping product comprises an adhesive, a coating, a caulk, or a sealant.

21. A structure, comprising the sound damping product of claim 20.

22. A method for damping sound in a structure, comprising:
    applying a composition comprising 47 to 70 parts by weight of a polymer, a polyacrylate thickener, and a polyurethane thickener to the surface of the structure, wherein the total amount of thickeners in the composition is less than 10% by weight based on the total weight of the composition; and
    drying the composition, wherein the polyacrylate thickener comprises sodium polyacrylate.

23. A sound damping composition, comprising:
    a polymer derived from greater than 80% of one or more monomers selected from the group consisting of butyl acrylate, 2-ethylhexyl acrylate, methyl methacrylate, methyl acrylate, ethyl acrylate, and combinations thereof and greater than 0% to less than 4% of one or more functional monomers;
    at least one thickener to increase the viscosity of the composition, wherein the at least one thickener is present in an amount of less than 10% by weight based on the total weight of the composition and includes a polyacrylate thickener; and
    a surfactant, wherein the polyacrylate thickener comprises sodium polyacrylate.

24. The composition of claim 23, wherein the thickener further includes a polyurethane thickener.

25. The composition of claim 1, wherein the composition comprises
    0.1 to 1.0 part by weight of the polyacrylate thickener; and
    0.1 to 1.0 part by weight of the polyurethane thickener.

26. A sound damping composition, comprising:
    47 to 70 parts by weight of a polymer derived from greater than 80% of one or more monomers selected from the group consisting of butyl acrylate, 2-ethylhexyl acrylate, methyl acrylate, ethyl acrylate, vinyl acetate, and combinations thereof and greater than 0% to less than 10% of one or more monomers selected from (meth)acrylonitrile, methacrylic acid, acrylic acid, vinylsulfonic acid, itaconic acid, hydroxyethyl(meth)acrylate, hydroxypropyl(meth)acrylate, diacetone-acrylamide, and combinations thereof, wherein the polymer has a $T_g$ of from −10° C. to −50° C.;
    a polyacrylate thickener;
    a polyurethane thickener, and
    a surfactant;
    wherein the total amount of thickeners in the composition is 2 parts by weight or less, and
    wherein the viscosity of the composition is from 7,000 cP to 15,000 cP at a temperature of 23° C., wherein the polyacrylate thickener comprises sodium polyacrylate.

* * * * *